US012595735B2

(12) United States Patent
Vallati

(10) Patent No.: US 12,595,735 B2
(45) Date of Patent: Apr. 7, 2026

(54) SMART ROCK BOLT DRIVER

(71) Applicants: SANDVIK MINING AND CONSTRUCTION TOOLS AB, Sandviken (SE); SANDVIK MINING AND CONSTRUCTION AUSTRALIA PTY LTD, Milton (AU)

(72) Inventor: Osvaldo Vallati, New South Wales (AU)

(73) Assignees: Sandvik Mining and Construction Tools AB, Sandviken (SE); Sandvik Mining and Construction Australia Pty Ltd, Milton (AU)

( * ) Notice: Subject to any disclaimer, the term of this patent is extended or adjusted under 35 U.S.C. 154(b) by 343 days.

(21) Appl. No.: 17/920,195

(22) PCT Filed: Apr. 21, 2021

(86) PCT No.: PCT/EP2021/060321
§ 371 (c)(1),
(2) Date: Oct. 20, 2022

(87) PCT Pub. No.: WO2021/214105
PCT Pub. Date: Oct. 28, 2021

(65) Prior Publication Data
US 2023/0184111 A1 Jun. 15, 2023

(30) Foreign Application Priority Data
Apr. 22, 2020 (EP) ..................................... 20170773

(51) Int. Cl.
*E21D 20/00* (2006.01)
*G01L 5/00* (2006.01)
*G01P 3/00* (2006.01)
*G01P 13/00* (2006.01)

(52) U.S. Cl.
CPC ............ *E21D 20/00* (2013.01); *G01L 5/0042* (2013.01); *G01P 3/00* (2013.01); *G01P 13/00* (2013.01)

(58) Field of Classification Search
CPC ....... E21D 20/00; E21D 20/003; E21D 21/00; E21D 21/0093; G01L 15/0042; G01P 3/00; G01P 13/00
See application file for complete search history.

(56) References Cited

U.S. PATENT DOCUMENTS 4,023,626 A * 5/1977 Salmi ....................... B25D 9/12
173/8
4,444,530 A * 4/1984 Brest van Kempen .....................
E21D 21/02
73/818

(Continued)

FOREIGN PATENT DOCUMENTS

AU 2010223134 B2 9/2011
CZ 25706 U1 7/2013

*Primary Examiner* — Benjamin F Fiorello
(74) *Attorney, Agent, or Firm* — Corinne R. Gorski

(57) ABSTRACT
A driver socket arranged for installation of a ground reinforcement bolt, wherein the driver socket includes a rotation sensor arranged for measuring rotation of the driver socket 1. The driver socket includes a processing unit configured to receive a signal from the rotation sensor and to derive, based on the signal from the rotation sensor, rotation data related to the number of revolutions the driver socket has been rotated.

15 Claims, 1 Drawing Sheet

(56) References Cited

U.S. PATENT DOCUMENTS

| | | | | | |
|---|---|---|---|---|---|
| 4,729,696 | A | * | 3/1988 | Goto | C08F 299/026 |
| | | | | | 525/531 |
| 6,216,800 | B1 | * | 4/2001 | Wilson | B23Q 17/00 |
| | | | | | 173/4 |
| 6,732,813 | B1 | * | 5/2004 | Eklof | E21B 44/06 |
| | | | | | 173/1 |
| 6,938,702 | B2 | * | 9/2005 | Saha | E21B 44/08 |
| | | | | | 173/4 |
| 7,604,070 | B2 | * | 10/2009 | Kemppainen | E21B 44/04 |
| | | | | | 173/112 |
| 8,091,652 | B2 | * | 1/2012 | Sinnerstad | E21B 44/02 |
| | | | | | 175/24 |
| 9,033,065 | B2 | * | 5/2015 | Viitaniemi | E21B 44/02 |
| | | | | | 175/27 |
| 2006/0161289 | A1 | * | 7/2006 | Williams | E21D 20/003 |
| | | | | | 700/177 |
| 2007/0027585 | A1 | * | 2/2007 | Wulff | G06F 1/163 |
| | | | | | 701/1 |
| 2007/0144781 | A1 | | 6/2007 | Hinshaw et al. | |
| 2011/0147084 | A1 | * | 6/2011 | Sinnerstad | E21B 44/06 |
| | | | | | 700/275 |
| 2015/0218947 | A1 | | 8/2015 | Vogel et al. | |
| 2015/0316576 | A1 | * | 11/2015 | Pakzad | G01P 15/00 |
| | | | | | 702/141 |
| 2020/0199941 | A1 | * | 6/2020 | Piispanen | E21B 6/02 |

* cited by examiner

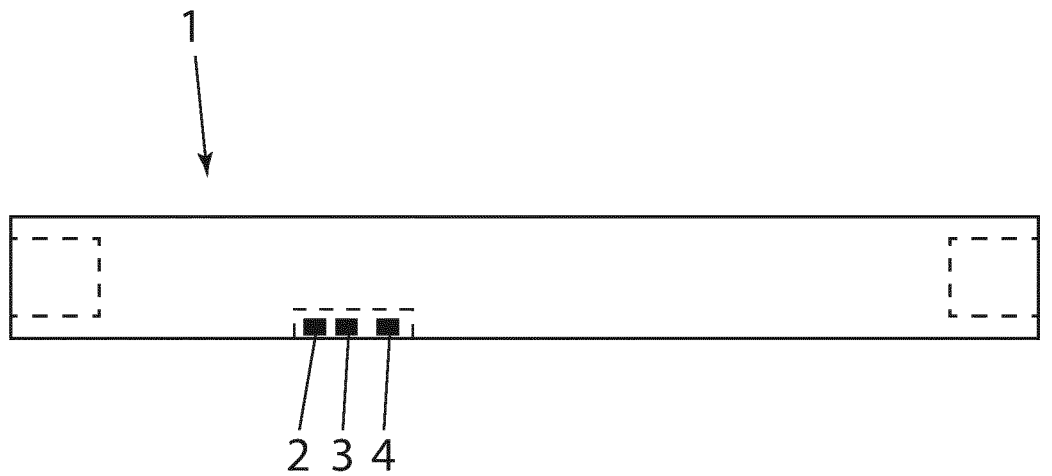

SMART ROCK BOLT DRIVER

RELATED APPLICATION DATA

This application is a § 371 National Stage Application of PCT International Application No. PCT/EP2021/060321 filed Apr. 21, 2021 claiming priority to EP 20170773.4 filed Apr. 22, 2020.

TECHNICAL FIELD

The present disclosure relates to rock bolts for reinforcement of formations, such as rock strata, and specifically to technology for monitoring installation of such bolts, especially monitoring of rotation of a nut, or similar, attached to the outer end portion of the bolt.

BACKGROUND

Formations, such as rock formations or rock strata, are often reinforced using rock bolts. For example, rock bolts are commonly used for reinforcement of tunnel roofs and for stabilization of rock walls, slopes and dikes. Various types of rock bolts or anchors are used depending for example on the type of formation to be reinforced.

A common type of rock bolt is the hydraulically expandable rock bolt provided with an expandable body to be driven into a formation and thereafter expanded by introduction of a pressurized pressure medium such that the expandable body presses against the wall of the borehole and thereby engages the formation. A hydraulically expandable rock bolt is known from CZ 25706 U1.

Another type of rock bolt is the friction bolt. Such a rock bolt may be driven into a formation by a driving device such as a jumbo. The mechanically expandable bolt comprises an elongate expandable outer body, sometimes referred to as a split tube, and a central rod extending inside the outer body from a trailing portion provided with a nut to a leading portion operatively connected to an expansion mechanism for expanding the outer body upon rotation of the central rod.

At installation of the mechanically expandable rock bolt in the formation, the driving device is operated to repeatedly impact the outer body of the bolt, thereby forcing the outer body into the formation. When the bolt is sufficiently far driven into the formation the bolt is expanded by rotation of the nut, which causes rotation of the central rod such that the expansion mechanism causes expansion of the outer body. The nut may be a blind nut such that the nut can first be screwed onto a thread at the trailing portion of the central rod, wherein the central rod eventually bottoms out in the blind nut, thereby preventing further relative rotation between the central rod and the blind nut. This allows torque to be applied to the nut and further to the central rod for tensioning of the expansion mechanism of the bolt. Other means for preventing co-rotation between the central rod and nut are feasible, such as thread-locking fluid or a shearing pin, wherein a standard nut with through hole may be used instead of a blind nut.

Some friction bolts comprise an outer body but no expansion mechanism, wherein the bolt is forced into the formation with a press-fit to anchor the bolt in the formation.

For many types of rock bolt, it is advantageous to rotate the blind nut after driving the bolt into the formation to thereby increase strength of the attachment of the bolt to the formation.

Non-expandable bolts, such as resin bolts, may also need rotation after insertion by rotation of a nut attached to a trailing portion of the bolt.

AU2010223134B2 discloses a mechanically expandable friction bolt.

Sometimes, an operator installing a rock bolt does not rotate the blind nut after driving the bolt into the formation and instead removes the driving device from the blind nut. Effectively this means that the bolt has not been properly installed.

Manual inspection and tightening of a plurality of bolts in a formation is time-consuming and error-prone and faulty installation of the rock bolts is dangerous since portions of the formation may unintentionally collapse.

Each nut should preferably be rotated a predetermined number of revolutions, or to a predetermined torque. Rotating the nut too few revolutions may lead to the bolt not expanding enough thereby engaging the formation with a high enough force. On the other hand, rotating the nut too many revolutions may lead to cracks in the formation, thereby reducing the strength of the formation.

Sometimes the mining machine carrying a driver socket is provided with a torque control device configured to allow the operator to set a predetermined target torque to apply to the driver socket for rotation of the nut of the rock bolt. However, the operator may still forget to activate rotation of the driver socket after the bolt has been driven into the formation.

Accordingly, there is a need for an improved means for promoting correct installation of rock bolts.

SUMMARY

An object of the invention is to enable improved control of rock bolt installation to ensure that the driver socket has been adequately rotated for correct installation of each rock bolt.

According to a first aspect of the invention this object is achieved by a driver socket for installation of a ground reinforcement bolt. The driver socket comprises a rotation sensor for measuring rotation of the driver socket. Also, the driver socket comprises a processing unit configured to receive a signal from the rotation sensor and configured to derive, based on the signal from the rotation sensor, rotation data related to the number of revolutions the driver socket has been rotated.

Upon rotation of the driver socket, the rotation sensor measures rotation of the driver socket and emits a signal. The signal is received by the processing unit which derives rotation data related to the number of revolutions the driver socket has been rotated. Hence, such a driver socket enables control of the operation of the driver socket based on knowledge about the number of revolutions the driver socket has been rotated since the installation of the bolt began. By integrating the rotation sensor in the driver socket, the rotation data is made available independently of what type of machine the driver socket is attached to. Hence, the driver socket enables a plug-n-play approach to measuring rotation of the bolt installed and enables monitoring of correct installation of ground reinforcement bolts using any existing machine carrying the novel driver socket.

The rotation data may comprise data describing average rotational speed over a predetermined period of time, data describing number of revolutions the driver socket has rotated at one or more specific points in time, or data describing if the driver socket has been rotated or not.

Typical examples of rotation data are the number of revolutions the driver socket has been rotated, the average rotational speed or acceleration data. Both average speed and acceleration data can be used to derive the number of revolutions driver socket has been rotated.

The sensor may comprise a gyroscope and/or an accelerometer and/or an inclinometer.

Also, the driver socket may further comprise a wireless transmitter or transceiver configured to emit a signal comprising the rotation data.

By emitting a signal comprising the rotation data, remote reception of the rotation data is enabled, such that a remote entity can be used to monitor rotation of a ground reinforcement bolt in real time and without any wired or direct physical contact to the driver socket rotated.

According to a second aspect of the invention this object is also achieved by a method of monitoring installation of a ground reinforcement bolt, wherein the method comprises receiving rotation data from one or more driver sockets, and either according to alternative a) recording the rotation data to a data carrier, or according to alternative b) deriving from the rotation data a rotation value describing the number of revolutions the driver socket has been rotated, emitting a first signal if the rotation value exceeds a lower threshold value defining a minimum number of revolutions the driver socket should be rotated for correct installation, and/or creating or updating a data record on a data carrier if the rotation value exceeds the lower threshold value, said data record comprising an identifier for the bolt currently rotated and data indicating that the bolt has been rotated the required number of revolutions.

According to this method, rotation data is obtained from one or more driver sockets and used to determine whether to emit a signal indicating that the ground reinforcement bolt has been rotated enough for it to be considered correctly installed or not. Specifically, the method comprises determining a rotation value describing the number of revolutions the driver socket has been rotated. This may be as simple as using a number of revolutions already given explicitly by the rotation data but may require calculation of revolutions based on average rotational speed and/or acceleration data. Once the number of revolutions the driver socket has been rotated has been determined, it is compared to the threshold value.

Also, if the driver socket has been rotated enough a data record can be created or updated such that a person or system can easily consult the data records on the data carrier to see if a bolt is correctly installed or not. Hence, once the driver socket is removed from a reinforcement bolt inserted into ground, the driver socket can be used to installing another bolt, wherein the data records of the data carrier are used to keep track of which bolts have been correctly installed.

The method may further comprise emitting a second signal if the rotation value exceeds an upper threshold value defining a maximum number of revolutions the driver socket can be rotated for correct installation and/or creating or updating a data record on a data carrier if the rotation value exceeds the upper threshold value, said data record comprising an identifier for the bolt currently rotated and data indicating that the bolt has been over-rotated.

Also, the method may further comprise recording the duration of the installation of each bolt and creating or updating a data record on a data carrier if the rotation value exceeds the lower threshold value, said data record comprising the duration of installation of the bolt currently rotated and an identifier for the bolt currently rotated.

The electronics of the driver socket may thus also be used to keep track of the duration of installation of each ground reinforcement bolt by recording when installation of the bolt starts and stops respectively. Any one or more suitable durations can be measured for each bolt, such as from the start of driving the bolt into the ground and/or the start of rotation of the driver socket. Also, the end of the duration may be the time of detection of the bolt having been rotated a number of revolutions higher than the threshold value and/or it may be the time when the bolt has been inserted into the bore in the ground but before rotation of the driver socket commences. The duration can for example be used for benchmarking and statistics purposes to improve installation efficiency and quality.

Also, the method may comprise receiving torque data from a torque sensor configured to measure torque applied to the driver socket, and deriving rotational resistance data based on the torque data and the rotation data.

By so deriving rotational resistance data, it is possible to verify if rotational resistance is suddenly lowered upon further rotation of the driver socket, typically indicating something gone wrong during installation such as formation of cracks around the reinforcement bolt. Also, the rotational resistance data enables follow-up based on resistance vs current type of ground.

The torque sensor may be integrated with a machine carrying the driver socket, such as a jumbo.

The machine carrying the driver socked at installation of a ground reinforcement bolt is typically provided with a torque adjustment means allowing the torque applied by the machine to the driver socket to be set as appropriate based on experience. Torque data is thus available directly or indirectly from the machine carrying the driver socket and by adapting the method of installing the ground reinforcement bolt to also comprise a step of deriving rotational resistance data for each bolt installed, it is possible to get a better understanding of the installation of each bolt and take measures to correct any deviations. For example, if the rotational resistance suddenly decreases after a long increase it may be due to the bolt having cracked the ground such that the bolt no longer correctly reinforces the ground as intended. One can then consider taking any appropriate measure such as replacing the ground reinforcement bolt or adding additional bolts nearby.

The method may further comprise continuously comparing current rotational resistance to a lower resistance threshold, and a)
emitting a third signal if the comparison indicates that the rotational resistance sinks below the lower resistance threshold, and/or
b)
creating or updating a data record on a data carrier if comparison indicates that the rotational resistance sinks below the lower resistance threshold, said data record comprising an identifier for the bolt currently rotated and data indicating that the torque has decreased below the lower resistance threshold.

By continuously monitoring if the rotational resistance drops more than expected appropriate measures can be takes such as replacing the ground reinforcement bolt or adding additional bolts nearby. A lower resistance threshold is used to determine deviations of interest. The lower resistance threshold may be a dynamically calculated threshold or it may be a predetermined threshold.

The lower resistance threshold may be continuously calculated by continuously recording a maximum value of the rotational resistance based on the rotational resistance data and then calculate the lower resistance threshold as a predetermined fraction of the maximum value of the rotational resistance data. Since a slight variation up and down of the rotational resistance is normal it may not suffice to look for an instantaneous lowering of the torque since that may trigger a false impression of that a maximum torque has been reached and over-rotation has begun. Instead, a lower resistance threshold should be used which lower resistance threshold may be dynamically calculated as a predetermined fraction of the maximum value rather than based on a predetermined lower threshold value.

The emitted first, second and/or third signal(s) may be presented using an audio communication device, such as a speaker, or using a visual communication device, such as a light source or a display unit.

By presenting the first signal using an audio communication device or a visual communication device, the signal is readily comprehensible by an operator in control of the reinforcement bolt installation such that the operator knows when the bolt has been correctly installed.

According to a third aspect of the invention this object is also achieved by a monitoring system for monitoring installation of a ground reinforcement bolt. The monitoring system comprises a driver socket as described above and a computer program product configured to perform the method as described above.

The monitoring system may further comprise a mobile computing device for running the computer program product, such as a smart phone or a mobile terminal.

BRIEF DESCRIPTION OF DRAWINGS

FIG. 1 shows a simplified side view of a driver socket according to a first embodiment with dashed lines indicating central recesses respectively for receiving the bolt and for attaching to the mining machine.

DETAILED DESCRIPTION

A driver socket according to a first embodiment and its use together with a mining machine will hereinafter be described with reference to the appended drawing. The driver socket 1 is for installation of a ground reinforcement bolt in a formation. The driver socket comprises a rotation sensor 2 for measuring rotation of the driver socket 1. The driver socket 1 also comprises a processing unit 3 configured to receive a signal from the rotation sensor 2 and configured to derive, based on the signal from the rotation sensor 2, rotation data related to the number of revolutions the driver socket 1 has been rotated. The rotation sensor is an electronic rotation sensor.

The rotation data comprises data describing average rotational speed over a predetermined period of time, data describing number of revolutions the driver socket 1 has rotated at one or more specific points in time, or data describing if the driver socket 1 has been rotated or not.

Typical examples of rotation data are the number of revolutions the driver socket has been rotated, the average rotational speed or acceleration data. Both average speed and acceleration data can be used to derive the number of revolutions driver socket has been rotated, if needed. The provision of such a rotation sensor on a driver socket enables a drop-in replacement for many existing types of driver sockets to provide for monitoring of bolt installation by studying the rotation data provided by the sensor. The rotation data can be analyzed in real-time or as a post-installation procedure to censure safe and timely bolt installation.

The rotation sensor 2 comprises a gyroscope and/or an accelerometer and/or an inclinometer. The gyroscope, accelerometer and/or inclinometer is/are configured to determine the rotation data taking account of the position/orientation of the rotation sensor relative to the rotational axis of the driver socket.

The driver socket 1 further comprises a wireless transmitter or transceiver 4 configured to emit a signal comprising the rotation data. However, the driver socket may alternatively or additionally comprise a data carrier, such as a computer memory, configured to hold rotation data instead of/in addition to emitting a signal with the rotation data.

By emitting a signal comprising the rotation data, remote reception of the rotation data is enabled, such that a remote entity can be used to monitor rotation of a ground reinforcement bolt in real time and without any wired or direct physical contact to the driver socket rotated.

A second aspect of the invention relates to a method of monitoring installation of a ground reinforcement bolt. The method comprises: receiving rotation data from one or more driver sockets 1 according to any one of claims 1-4, and recording the rotation data to a data carrier. The data carrier may be integrated in the driver socket or it may be provided remotely from the data carrier, such as in a separate storage device. Examples of storage devices are cloud storage devices, handheld terminals or mining machine on-board computer systems.

The method may additionally or alternatively comprise a step of deriving from the rotation data a rotation value describing the number of revolutions the driver socket 1 has been rotated.

The method may additionally comprise to emit a first signal if the rotation value exceeds a lower threshold value defining a minimum number of revolutions the driver socket 1 should be rotated for correct installation. Also, the method may comprise creating or updating a data record on the data carrier if the rotation value exceeds the lower threshold value, said data record comprising an identifier for the bolt currently rotated and data indicating that the bolt has been rotated the required number of revolutions.

The method may further comprise emitting a second signal if the rotation value exceeds an upper threshold value defining a maximum number of revolutions the driver socket 1 can be rotated for correct installation. Alternatively, or additionally, the method may comprise creating or updating a data record on a data carrier if the rotation value exceeds the upper threshold value, said data record comprising an identifier for the bolt currently rotated and data indicating that the bolt has been over-rotated.

A single data carrier may be used for all data storing needs mentioned or a plurality of data carriers may be provided instead.

The method also comprises the optional step of recording the duration of the installation of each bolt and creating or updating a data record on a data carrier if the rotation value exceeds the lower threshold value, said data record comprising the duration of installation of the bolt currently rotated and an identifier for the bolt currently rotated.

The installation time for each bolt is measured from when rotation is deemed to have started until installation of the bolt is deemed to be finished.

Also, the method comprises the optional step of receiving torque data from a torque sensor configured to measure torque applied to the driver socket 1, and deriving rotational resistance data based on the torque data and the rotation data 4.

Here, the torque sensor used is an eternal one integrated with the machine carrying the driver socket, i.e. the mining machine. However, the torque sensor may alternatively be provided somewhere else, such as integrated with the driver socket or mounted between the mining machine and the driver socket.

The method further comprises continuously comparing current rotational resistance to a lower resistance threshold. Once, the comparison indicates that the rotational resistance sinks below the lower resistance threshold a third signal is emitted. Alternatively, or additionally, a data record on a data carrier is created or updated if the comparison indicates that the rotational resistance sinks below the lower resistance threshold. The data record comprises an identifier for the bolt currently rotated and data indicating that the torque has decreased below the lower resistance threshold.

The lower resistance threshold is continuously calculated as a predetermined fraction of the maximum value of the rotational resistance data. However, any other suitable statistical calculation may be used to derive a suitable lower resistance threshold.

Instead of using information from a torque sensor for determining if a bolt rotates too easily, rotation data may be used to draw the same conclusion. In that case, the method further comprises continuously monitoring current rotational speed and comparing it to a predetermined upper rotational speed threshold, and emitting a third signal if the comparison indicates that the rotational speed exceeds the upper rotational speed threshold. Alternatively, or additionally creating or updating a data record on a data carrier if comparison indicates that the rotational speed exceeds the upper rotational speed threshold, said data record comprising an identifier for the bolt currently rotated and data indicating that the rotational speed has exceeded the upper rotational speed threshold.

The emitted first, second and/or third signal(s) are presented using an audio communication device in the form of a speaker, and using a visual communication device in the form of a display unit. In other embodiments, audible and/or visible presentation of emitted signals may be omitted.

In an aspect, the technology is delivered in the form of a monitoring system for monitoring installation of a ground reinforcement bolt, wherein the monitoring system comprises a driver socket 1 as described above and a computer program product configured to perform the method described above.

The system may further comprise a mobile computing device for running the computer program product, such as a smart phone or a mobile terminal.

The invention claimed is:

1. A driver socket for installation of a ground reinforcement bolt, the driver socket comprising:
   a rotation sensor arranged for measuring rotation of the driver socket, the rotation sensor comprising a gyroscope, an accelerometer and/or an inclinometer, and wherein the gyroscope, accelerometer and/or inclinometer is/are configured to determine rotation data taking account of a position/orientation of the rotation sensor relative to a rotational axis of the driver socket;
   a processing unit configured to receive a signal from the rotation sensor and configured to derive, based on the signal from the rotation sensor, rotation data related to a number of revolutions the driver socket has been rotated; and a wireless transmitter or transceiver configured to emit a signal comprising the rotation data.

2. The driver socket according to claim 1, wherein the rotation data comprises data describing average rotational speed over a predetermined period of time, data describing number of revolutions the driver socket has rotated at one or more specific points in time, or data describing if the driver socket has been rotated or not.

3. A method of monitoring installation of a ground reinforcement bolt, the method comprising the steps of:
   receiving rotation data from one or more driver sockets according to claim 1;
   recording the rotation data to a data carrier, or
   deriving from the rotation data a rotation value describing the number of revolutions the driver socket has been rotated;
   emitting a first signal if the rotation value exceeds a lower threshold value defining a minimum number of revolutions the driver socket should be rotated for correct installation; and/or
   creating or updating a data record on a data carrier if the rotation value exceeds the lower threshold value, said data record including an identifier for a bolt currently rotated and data indicating that the bolt has been rotated the required number of revolutions.

4. The method according to claim 3, further comprising emitting a second signal if the rotation value exceeds an upper threshold value defining a maximum number of revolutions the driver socket can be rotated for correct installation; and/or
   creating or updating a data record on a data carrier if the rotation value exceeds the upper threshold value, said data record including an identifier for the bolt currently rotated and data indicating that the bolt has been over-rotated.

5. The method according to claim 4, further comprising recording the duration of the installation of each bolt and creating or updating a data record on a data carrier if the rotation value exceeds the lower threshold value, said data record including the duration of installation of the bolt currently rotated and an identifier for the bolt currently rotated.

6. The method according to claim 4, further comprising continuously comparing current rotational resistance to a lower resistance threshold, and
   emitting a third signal if the comparison indicates that the rotational resistance sinks below the lower resistance threshold, and/or
   creating or updating a data record on a data carrier if comparison indicates that the rotational resistance sinks below the lower resistance threshold, said data record including an identifier for the bolt currently rotated and data indicating that the torque has decreased below the lower resistance threshold.

7. The method according to claim 6, further comprising recording a maximum value of the rotational resistance based on the rotational resistance data, wherein the lower resistance threshold is continuously calculated as a predetermined fraction of the maximum value of the rotational resistance data.

8. The method according to claim 4, further comprising continuously monitoring current rotational speed and comparing it to a predetermined upper rotational speed threshold, and
   emitting a third signal if the comparison indicates that the rotational speed exceeds the upper rotational speed threshold, and/or creating or updating a data record on a data carrier if comparison indicates that the rotational speed exceeds the upper rotational speed threshold, said data record including an identifier for the bolt currently rotated and data indicating that the rotational speed has exceeded the upper rotational speed threshold.

9. The method according to claim 8, wherein the emitted first, second and/or third signal(s) is presented using an audio communication device or a visual communication device.

10. The method according to claim 9, wherein the audio communication device is a speaker.

11. The method according to claim 9, wherein the visual communication device is selected from a light source or a display unit.

12. The method according to claim 3, further comprising receiving torque data from a torque sensor configured to measure torque applied to the driver socket, and deriving rotational resistance data based on the torque data and the rotation data.

13. The method according to claim 12, wherein the torque sensor is integrated with a machine carrying the driver socket.

14. A monitoring system for monitoring installation of a ground reinforcement bolt, the monitoring system comprising:

a driver socket including a rotation sensor arranged for measuring rotation of the driver socket and a processing unit configured to receive a signal from the rotation sensor and configured to derive, based on the signal from the rotation sensor rotation data related to a number of revolutions the driver socket has been rotated;

and a computer program product having computer executable code, which when executed is configured to perform the method according to claim 3.

15. The monitoring system according to claim 14, further comprising a mobile computing device for running the computer program product, the mobile computing device being selected from a smart phone or a mobile terminal.

\* \* \* \* \*